(12) United States Patent
Kawabe et al.

(10) Patent No.: US 6,327,436 B2
(45) Date of Patent: Dec. 4, 2001

(54) CAMERA AND OBJECT TRACING MECHANISM OF CAMERA

(75) Inventors: Koutaro Kawabe; Atsutaka Ito, both of Sakai; Satoshi Yokota; Kimihiko Nakamura, both of Toyonaka, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/333,676

(22) Filed: Jun. 16, 1999

(30) Foreign Application Priority Data

Jun. 16, 1998 (JP) .................................................. 10-168280

(51) Int. Cl.[7] .................................................. G03B 13/36
(52) U.S. Cl. .......................... 396/121; 396/147; 396/296
(58) Field of Search .................................... 396/121, 122, 396/123, 124, 233, 234, 153, 147, 296; 348/169, 170, 171, 172

(56) References Cited

U.S. PATENT DOCUMENTS 5,210,566 * 5/1993 Nishida .................................. 396/123
5,461,452 * 10/1995 Iwasaki .................................. 396/234
5,512,974 * 4/1996 Abe et al. ............................. 396/234

FOREIGN PATENT DOCUMENTS 5-173242  7/1993  (JP) .
7-38796   2/1995  (JP) .

* cited by examiner

*Primary Examiner*—W. B. Perkey
(74) *Attorney, Agent, or Firm*—Burns, Doane, Swecker & Mathis, LLP

(57) ABSTRACT

An object follow-up mechanism, installed in a camera, which allows the camera to follow movement of a main object to be photographed. The mechanism includes an image detection device for taking an image into a photographing visual field and for extracting a feature of the image; an image recognition device for recognizing a possible candidate region, on which the main object locates, on a basis of the feature; a display device for displaying the candidate region(s); a main object region selection device for selecting at least one candidate region from the displayed candidate region(s) as a main object region in which the main object is present; and a main object region storing device for storing the feature extracted by the image detection device as a feature standard with respect to the image in the main object region thus selected.

34 Claims, 11 Drawing Sheets

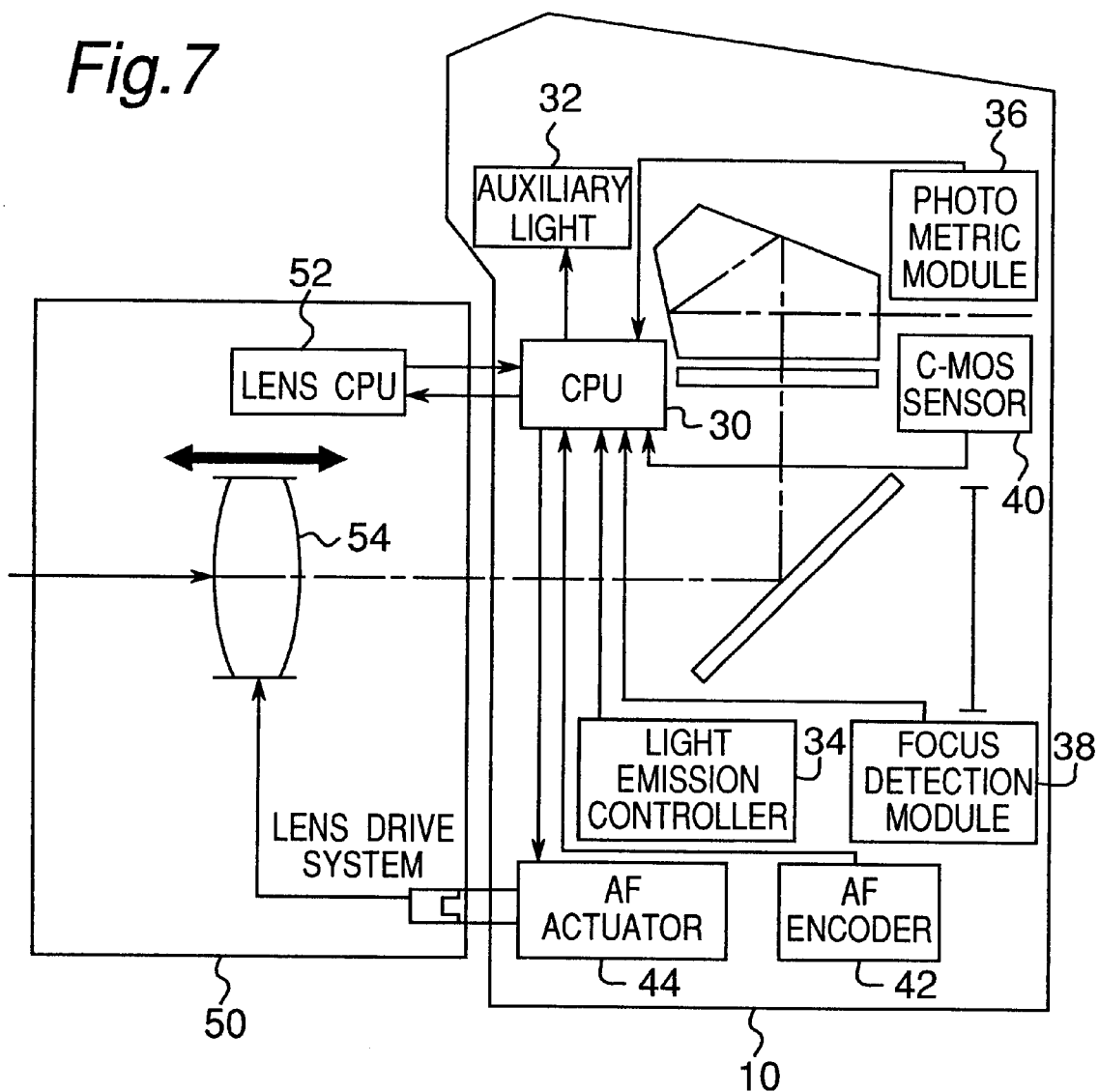

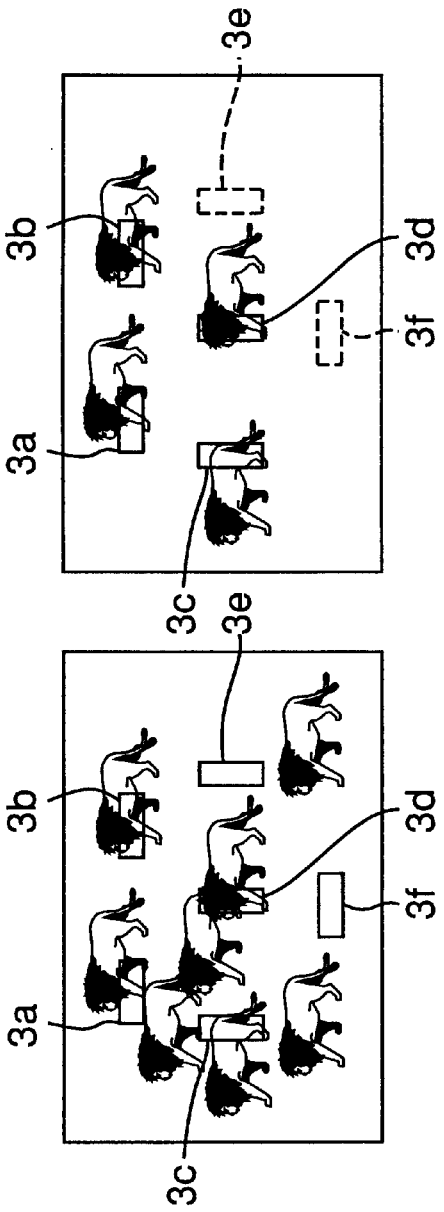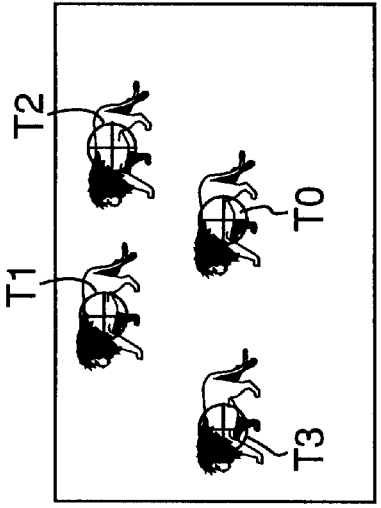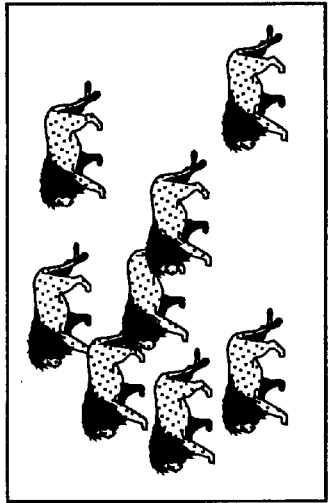

CAMERA AND OBJECT TRACING MECHANISM OF CAMERA

This application is based on application No. 10-168280 filed in Japan, the contents of which are hereby incorporated by reference.

BACKGROUND OF THE INVENTION

1. Field of the Invention

The present invention relates to a camera, and relates to an object tracing mechanism of the camera which makes it possible to follow up an object to be photographed.

2. Description of the Related Arts

Conventionally, there has been proposed an auto-focusing camera of a type in which its focusing area (focusing region) can be switched. The auto-focusing camera of this type has a following problem. Namely, provided that a right-hand focusing area 2c, for example, of three focusing areas 2a, 2b, 2c is selected and an object (or a subject) M is brought into a focus as shown in FIG. 1(A), and provided that the object M is moved in the left direction as shown in FIG. 1(B), it is not possible to bring the object M into the focus unless a photographer switches the focusing area from the right-hand focusing area 2c to the left-hand focusing area 2a.

On the other hand, conventionally, there has been proposed a camera of another type in which a focusing area is automatically determined by foreseeing a movement of the object from its change of contrast for example, so as to execute the focusing operation. According to this type of camera, however, in case that a plurality of objects M1 to M8, to be photographed, move as shown in FIG. 2, a photographer cannot voluntarily select a main object (or a main subject), to be photographed, out of the whole objects. Therefore, which object should be followed, or traced, to be focused on, depends upon the camera itself; namely, the photographer cannot select a particular main object to be focused on.

SUMMARY OF THE INVENTION

Therefore, it is an object of the present invention to provide a camera with an object tracing mechanism which can follow a movement of a main subject, even if the main subject moves.

In order to achieve the above object, according to one aspect of the present invention, there is provided a camera comprising: a detector for sensing an image of an object, for extracting a first characteristic of the image, and for outputting data of the first characteristic extracted; a selector for selecting a particular region within a visual field; and a memory for storing the data of the first characteristic, extracted by the detector, of the image which corresponds to the particular region selected by the selector, as characteristic reference data.

In the mechanism, the visual field, for example, can be a visual field within a finder of the camera.

The camera, for example, may be constructed as follows.

That is, the detector may further sense the image of the object, extract a second characteristic of the image, and output data of the second characteristic extracted, after the selector selects the particular region within the visual field, wherein the selector compares the data of the second characteristic with the characteristic reference data which is stored in the memory, so that a region generally coincident between the data of the second characteristic and the characteristic reference data is selected as a renewed particular region within the visual field.

According to the mechanism, the particular region which has once been selected by the selector, is renewed into the renewed particular region which is generally coincident mutually between the data of the second characteristic and the characteristic reference data, namely the region generally common both to the data of the second characteristic and to the characteristic reference data, within the visual field. Therefore, the object is followed up, or traced, within the visual field of the camera, when the object moves.

In order to achieve the above object, according to another aspect of the present invention, there is provided a camera comprising: a detector for sensing an image of at least one object, for extracting a first characteristic of the image, and for outputting data of the first characteristic extracted; a recognition means for recognizing at least one candidate region on which the image of a main object of the at least one object can locate, on a basis of the data of the first characteristic extracted by the detector; a display part for displaying the at least one candidate region which is recognized by the recognition means; a selection means for selecting one of the at least one candidate region, wherein the image of the main object is in the one thereof; and a memory for storing the data of the first characteristic, extracted by the detector, of the image which corresponds to the one, selected by the selection means, of the at least one candidate region, as characteristic reference data.

According to the mechanism, there is provided the memory for storing the data of the first characteristic of the image as characteristic reference data. Therefore, by using the characteristic reference data, the object is possible to be followed up, or traced, within the visual field of the camera when the object moves.

BRIEF DESCRIPTION OF THE DRAWINGS

This and other objects and features of the present invention will become clear from the following description taken in conjunction with the preferred embodiments thereof with reference to the accompanying drawings, in which:

FIG. 7 is an explanatory view showing a construction of the camera of FIG. 3;

FIGS. 11(A), 11(B), 11(C), 11(D) and 11(E) are explanatory views showing the camera with the object tracing mechanism according to a second embodiment of the present invention;

DETAILED DESCRIPTION OF THE PREFERRED EMBODIMENTS

Figure 1A:
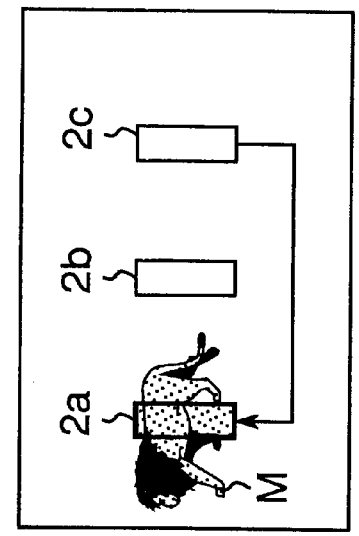
FIGS. 1(A), 1(B) and 1(C) are explanatory views of one type of conventional camera, showing a situation in which an object (or a subject) to be photographed moves.
Figure 1B:
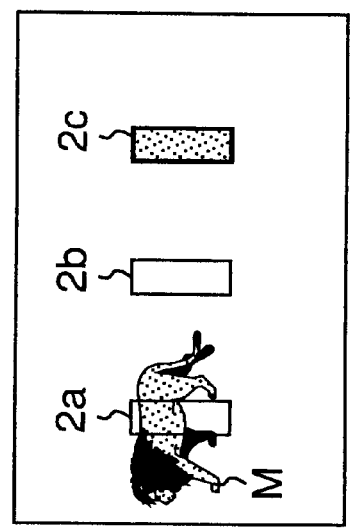
Figure 1C:
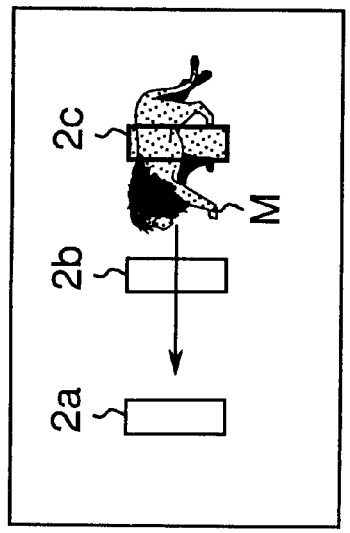
Figure 2:
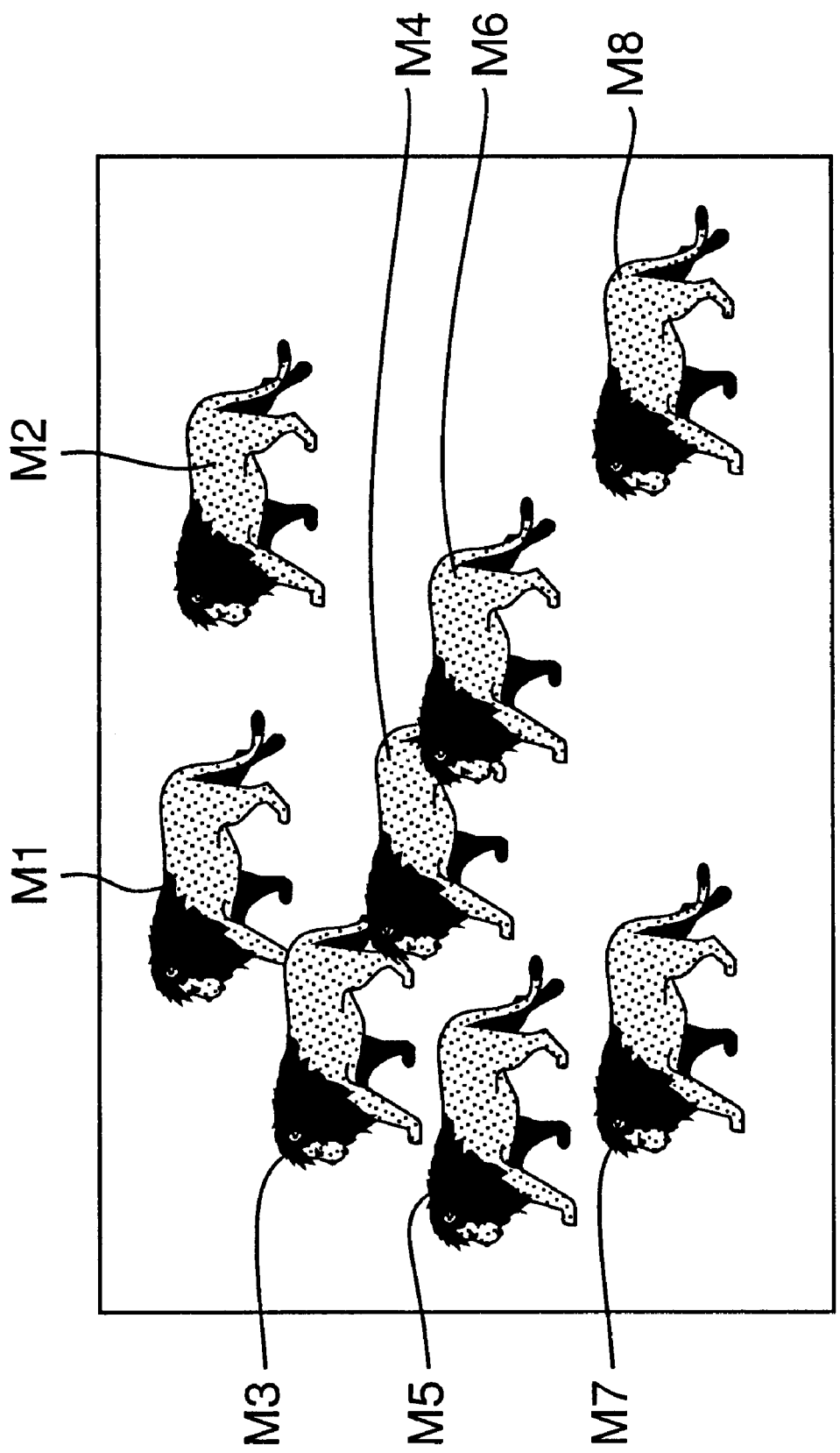
FIG. 2 is an explanatory view of another type of conventional camera, showing a situation in which many objects (or subjects) to be photographed are present.

Before a description of the preferred embodiments of the present invention proceeds, it is to be noted that like or corresponding parts are designated by like reference numerals throughout the accompanying drawings.

Referring to FIGS. 3 through 14, a detailed description is made below on a camera with an object tracing mechanism according to a first embodiment of the present invention and on the camera with the object tracing mechanism according to a second embodiment thereof.

First, referring to FIGS. 3 through 10, the description is made below on the camera with the object tracing mechanism according to the first embodiment thereof.

Figure 3:
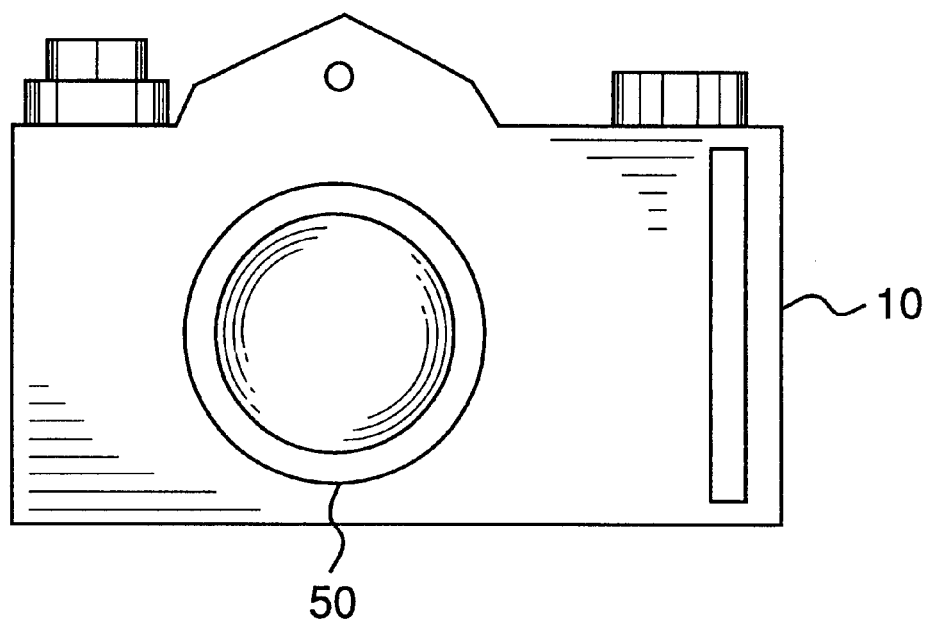
FIG. 3 is a front view showing a camera with an object tracing mechanism according to a first embodiment of the present invention.
Figure 4:
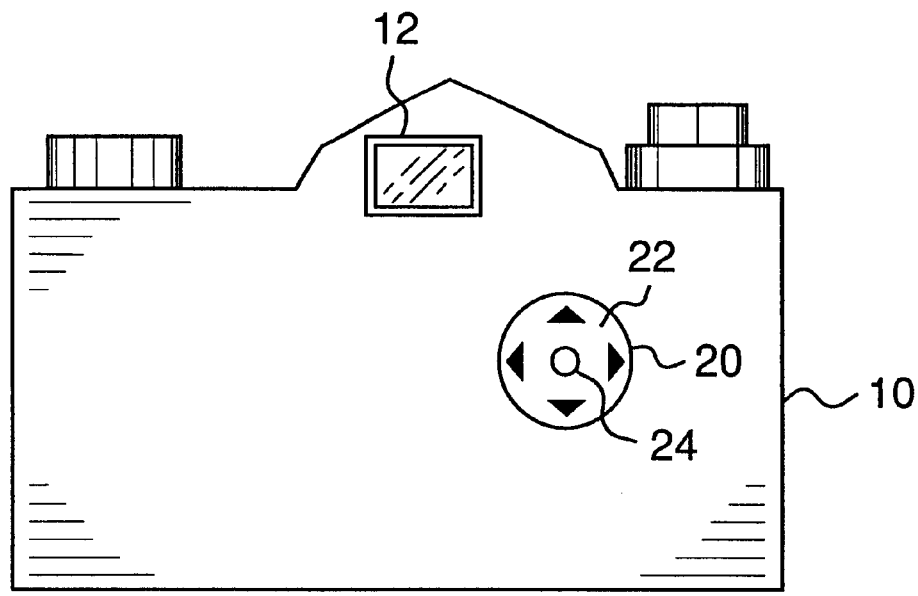
FIG. 4 is a rear view showing the camera of FIG. 3.

As shown in FIG. 3 which is a front view of the camera with the object tracing mechanism, and as shown in FIG. 4 which is a rear view thereof, the camera with the object tracing mechanism is a single-lens reflex camera which has a camera body 10 and an interchangeable lens 50 mounted thereto. The camera of the first embodiment has a construction generally similar to a construction of a conventional camera in appearance; however, the former camera is different from the latter in a display within a finder window 12, in a multidirectional switch 20 which is provided on a rear surface of the camera body 10, and in a selection button 24 which is also provided thereon.

Figure 5:
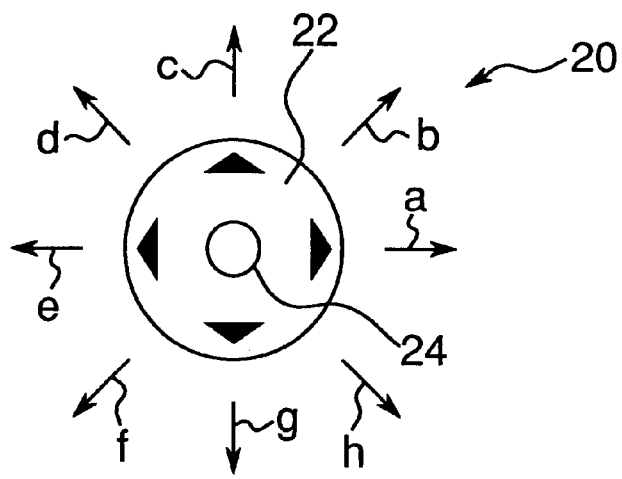
FIG. 5 is an explanatory view showing a multidirectional switch of the camera of FIG. 3.
Figure 6:
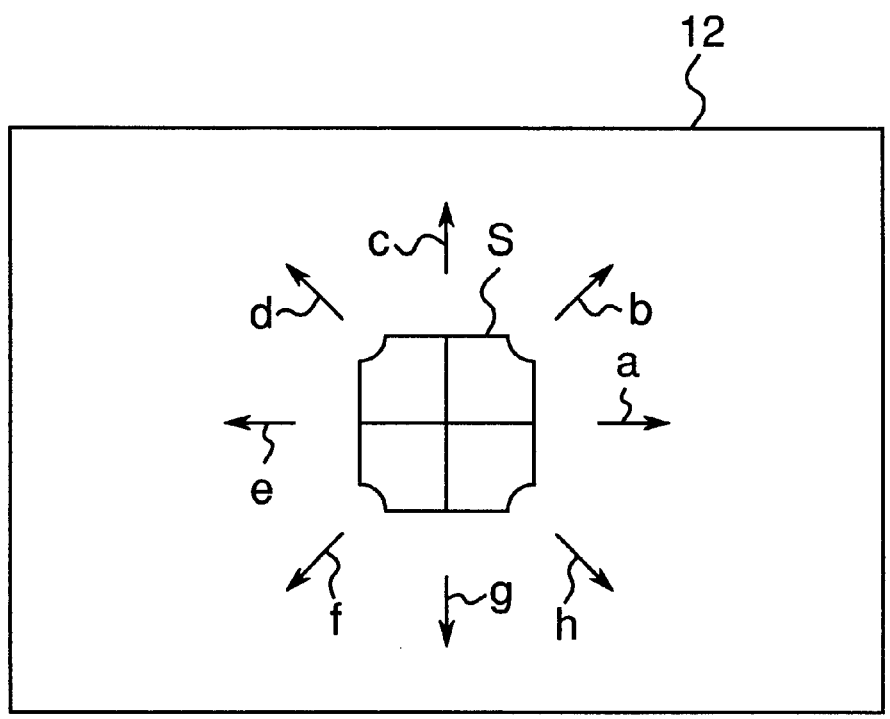
FIG. 6 is an explanatory view showing a finder (or finder window) of the camera of FIG. 3.

That is, as shown in FIGS. 5 and 6, a scope "S" is displayed on the finder window 12. The scope "S" moves in any direction "a" to "h" in compliance with a push, or press, against a desired location of a peripheral portion 22 of the multidirectional switch 20.

The selection button 24 is positioned at a central portion of the multidirectional switch 20. As will be described in detail later, when the selection button 24 is pushed or pressed, a characteristic, or a feature, of an image within a region corresponding to the scope "S" is stored, or memorized.

Next, referring to FIG. 7, a main internal construction of the camera is described below.

The camera body 10 has a control microcomputer 30, an auxiliary light emitting part 32 connected to the control microcomputer 30, a light emission controller 34 connected thereto, a photometric module 36 connected thereto, a focus detection module 38 connected thereto, a C-MOS sensor 40 connected thereto, an AF encoder 42 connected thereto, and an AF actuator 44 connected thereto. The control microcomputer 30 includes a CPU and a memory, and the control microcomputer 30 executes a general control over operation of the camera.

More specifically, the auxiliary light emitting part 32 emits an auxiliary light which is used for detecting a focus. The light emission controller 34 controls emission of the auxiliary light which is emitted from the auxiliary light emitting part 32. The photometric module 36 measures a luminance, or brightness, of an object (or a subject) to be photographed. The focus detection module 38 detects a focusing condition of an optical system 54 in an interchangeable lens 50. The C-MOS sensor 40 is so positioned as to pick up, or sense, an image formation position within a finder window 12 included in a finder optical system, in which the C-MOS sensor 40 takes in an image within a photographing region or area of the camera, processes the image at a high speed, and outputs to the control microcomputer 30 an image information upon a configuration, or outline, of the image and upon its movement (i.e. direction, and amount of movement). The C-MOS sensor 40 is constituted as a single element which is constituted by a MOS type of light receiving cell capable of reading data at a higher speed than a CCD (i.e. charge-coupled device) and by a processing part for extracting a characteristic, or a feature, thereof by processing the data read by the light receiving cell, at a high speed. The control microcomputer 30 processes a small amount of the data after the characteristic, or feature, thereof is extracted; therefore, the control microcomputer 30 is able to execute its control operation at a high speed.

The AF encoder 42 detects an amount of operation of the AF actuator 44. The AF actuator 44 drives a focusing lens in the optical system 54 of the interchangeable lens 50 through a lens drive system of the interchangeable lens 50.

The interchangeable lens 50 has a lens microcomputer 52 in addition to the optical system 54. The lens microcomputer 52 is connected with the control microcomputer 30 of the camera body 10 so that both the lens microcomputer 52 and the control microcomputer 30 communicate with each other.

Next, referring to FIGS. 8(A), 8(B), 8(C), FIGS. 9(A), 9(B), 9(C), and FIGS. 10(A), 10(B), 10(C), it is explained below about an operation of the camera.

Figure 8A:
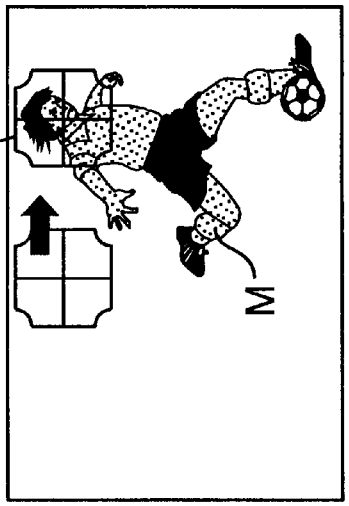
FIGS. 8(A), 8(B) and 8(C) are explanatory views for explaining a scope.
Figure 8B:
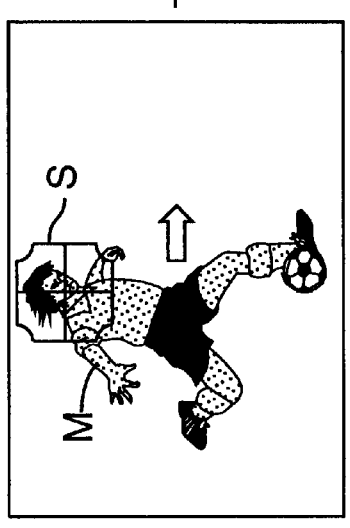

First, as shown by an arrow in FIG. 8(A), the multidirectional switch 20 (see FIG. 5) is manipulated to move the scope "S" displayed on the finder window 12, so that the scope "S" is superimposed, or overlapped, over a desired region (or area) of an object "M" where the desired region is the region that is desired to be followed, or traced, as shown in FIG. 8(B).

Then, the selection switch 24 is pressed. Thereby, the desired region over which the scope "S" is superimposed, is set as a main object region (or a main subject region). At this time, the control microcomputer 30 stores in the memory its image information (or image characteristic), extracted by the C-MOS sensor 40, upon the main object region, as a reference of the character.

Then, after the main object region is set, the control microcomputer 30 compares new image information (or image character), extracted by the C-MOS sensor 40, upon image in the photographing region, with the reference of the character which has been stored in the memory.

Then, when a part, or piece, of the new image information which is generally coincident with the reference of the character is detected, the control microcomputer 30 updates the part, or piece, as the main object region.

Figure 8C:
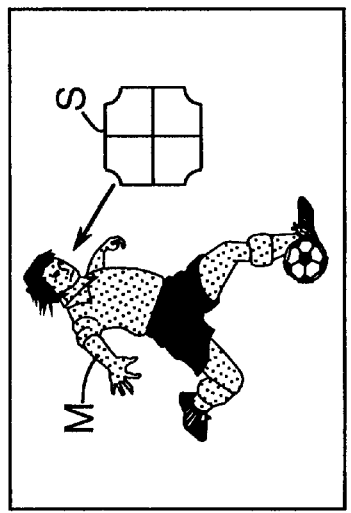

Then, as shown in FIG. 8(C), the microcomputer 30 moves the scope "S" to the updated main object region. In this manner, the scope "S" is moved to follow, or trace, the movement of the object "M".

A photographing condition is determined on a basis of the main object region.

Figure 9A:
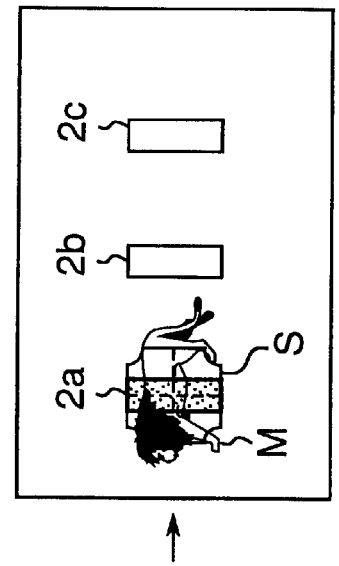
FIGS. 9(A), 9(B) and 9(C) are explanatory views for explaining a determination of photographing condition.
Figure 9B:
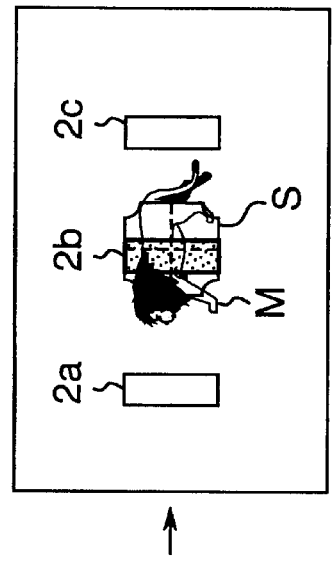
Figure 9C:
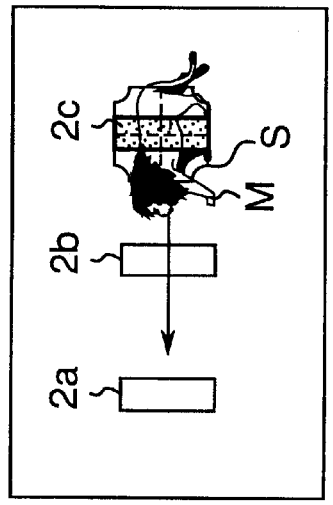

That is, for example, when the main object region is set by superimposing the scope "S" over the object "M", focusing areas (or focusing regions) 2c, 2b, and 2a over which the scope "S" superimposes following the movement of the object "M", are selected sequentially as shown in FIGS. 9(A), 9(B) and 9(C), and the object "M" is brought into the focus (or is focused) in each of the focusing areas 2c, 2b, and 2a.

Figure 10A:
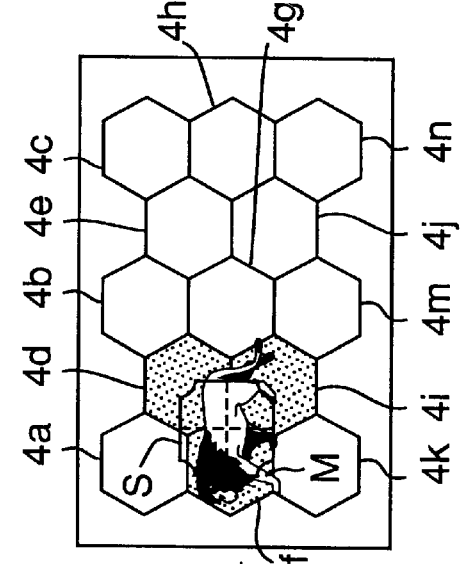
FIGS. 10(A), 10(B) and 10(C) are explanatory views for explaining the determination thereof.
Figure 10B:
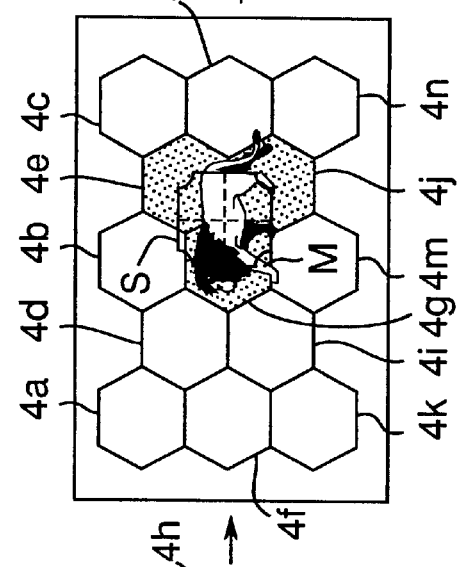
Figure 10C:
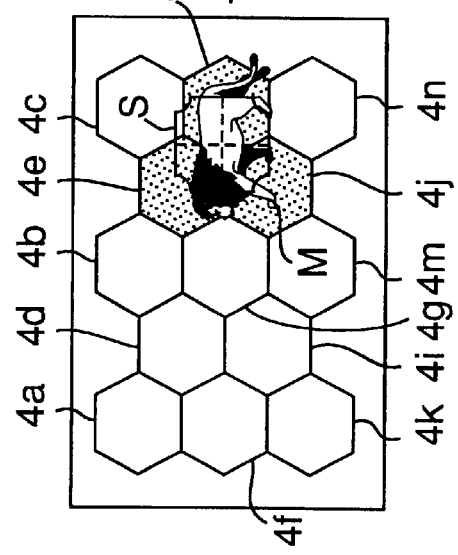

Meanwhile, as shown in FIGS. 10(A), 10(B) and 10(C), photometric cells 4e, 4h, 4j; 4e, 4g, 4j; and 4d, 4f, 4i over which the scope "S" superimposes are sequentially selected from a plurality of photometric cells 4a to 4n which are included in the photometric module 36 and which are arranged in a shape of honeycomb, in accordance with the movement of the object "M". An exposure of the camera is determined on a basis of the selected photometric cells 4e, 4h, 4j; 4e, 4g, 4j; and 4d, 4f, 4i.

Next, referring to FIGS. 11(A) through 11(E), the description is made below on the camera with the object tracing mechanism according to the second embodiment.

The camera with the object tracing mechanism of the second embodiment is similar to the camera of the first embodiment in construction; however, the former camera is different from the latter in manner of setting the main object region.

That is, when there exist a plurality of objects, to be photographed, within a photographing region as shown in FIG. 11(A), the control microcomputer 30 recognizes outlines of the objects, on a basis of image information (or image characteristic), extracted by the C-MOS sensor 40, upon the image within the photographing region, as shown in FIG. 11(B). And, the control microcomputer 30 seeks for the outline(s) of the object(s) which superimpose(s), or overlap(s), any one(s) of six focusing regions 3a to 3f, as shown in FIG. 11(C).

Then, as shown in FIG. 11(D), the control microcomputer 30 determines a center position of the outline of each of the object(s) which superimpose(s) any one(s) thereof. And, the control microcomputer 30 makes each of scopes T0 to T3, located at each center position, be displayed on the finder window 12, respectively. At an initial setting, for example, one scope T0 which is centrally positioned with respect to the scopes T0 to T3, is so displayed as to be the most conspicuous of all as shown in FIG. 11(E), in order to indicate that the particular object region which the scope T0 superimposes, or is positioned on, has been selected as a main object region. Then, similarly to the first embodiment, following the movement of the selected main object, the scope T0 moves, and a photographing condition is set on basis of the main object region.

Similar to the first embodiment, it is possible to switch, or move, the above main object region to the object region which any one of the other scopes T1 to T3 superimposes, by operating the multidirectional switch 20 and the selection switch 24.

The camera of the first and second embodiments can follow the movement of the main object when it moves.

The present invention is not limited to the aforementioned embodiments and modifications.

Figure 12:
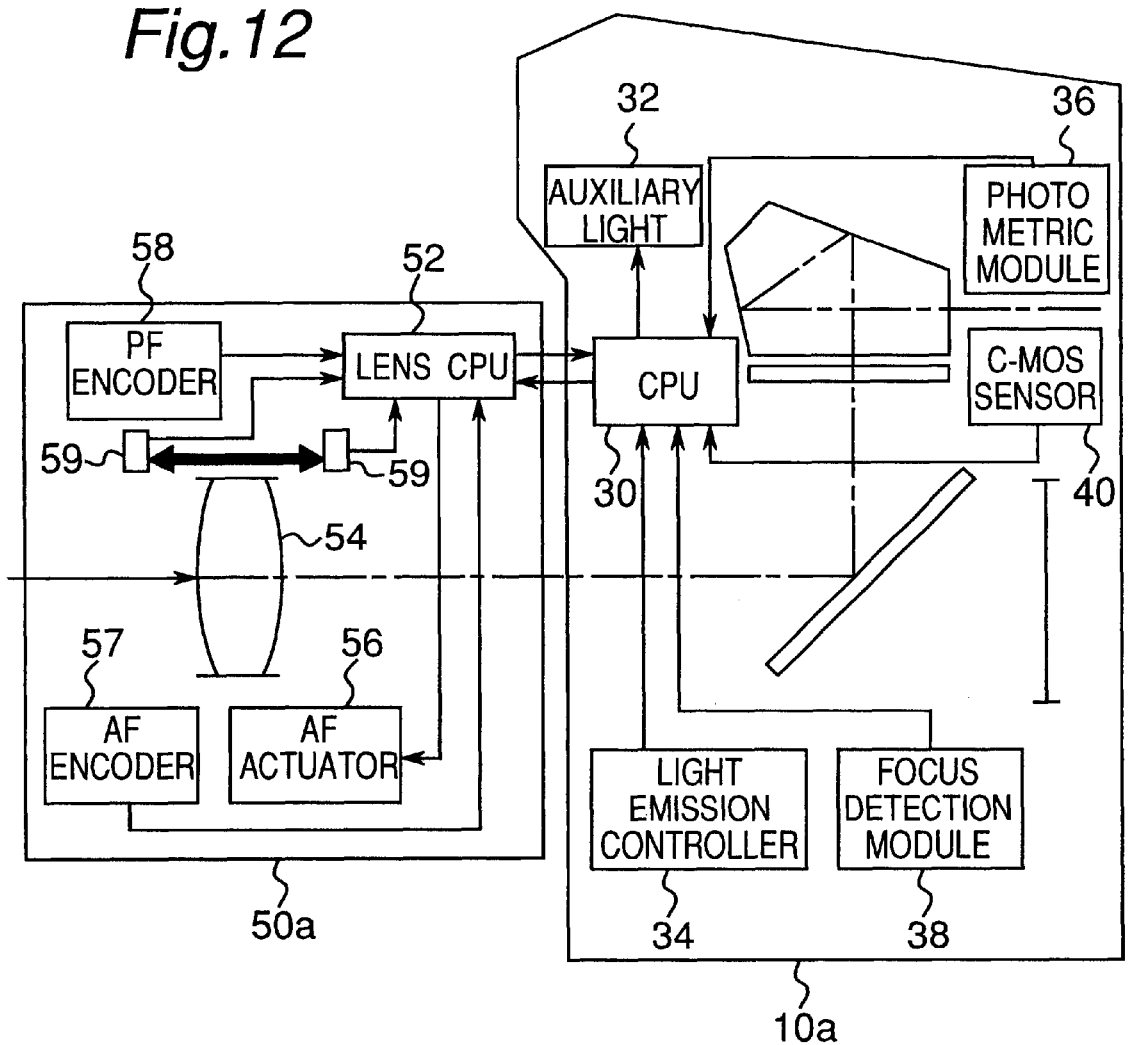
FIG. 12 shows a construction of the camera with the object tracing mechanism according to a modification of the embodiment.

For example, as shown in FIG. 12, an interchangeable lens 50a may accommodate therein a mechanism to control driving the interchangeable lens 50a; namely, the interchangeable lens 50a may accommodate therein an AF actuator 56 which drives a focusing lens in the optical system 54, an AF encoder 57 for detecting the driving amount of the AF actuator 56, a PF encoder 58 for detecting the position of the focus lens, and a termination switch 59 for detecting extremities of movement of the focusing lens. And in the construction, the focus lens of the optical system may be driven by a communication between the lens microcomputer 52 installed in the interchangeable lens 50a and the control microcomputer 30 installed in the camera body 10a.

Figure 13:
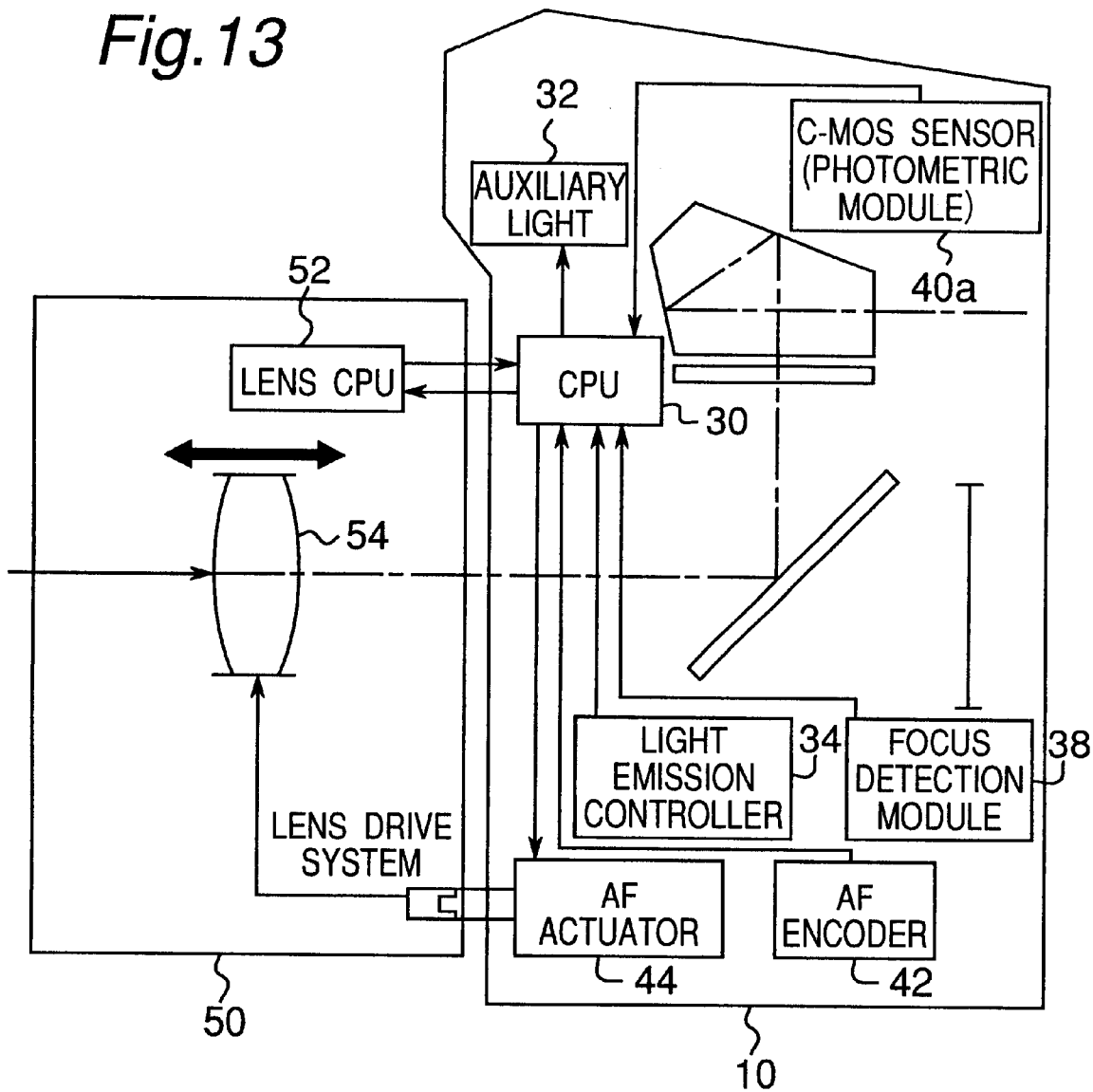
FIG. 13 shows a construction of the camera with the object tracing mechanism according to another modification of the embodiment.
Figure 14:
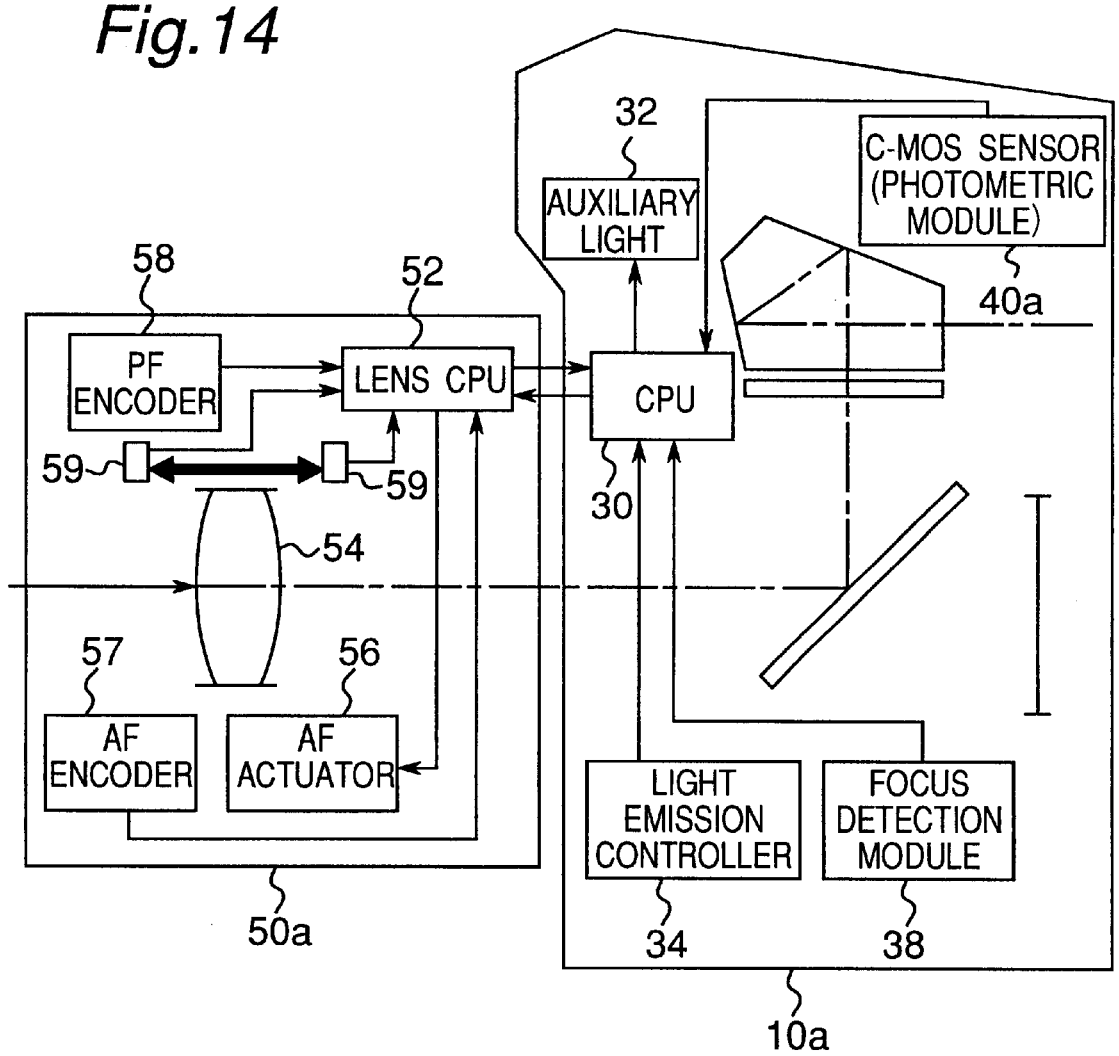
FIG. 14 shows a construction of the camera with the object tracing mechanism according to still another modification of the embodiment.

Alternatively, instead of employing the constructions shown in FIGS. 7 and 12, a C-MOS sensor 40a may have a function of the photometric module 36 as shown in FIGS. 13 and 14.

Although the present invention has been fully described in connection with the preferred embodiments and modifications thereof with reference to the accompanying drawings, it is to be noted that other various changes and modifications are also apparent to those skilled in the art.

Such changes and modifications are to be understood as included within the scope of the present invention as defined by the appended claims unless they depart therefrom.

What is claimed is:

1. A camera comprising:
    a detector for sensing an image of an object, for extracting a first characteristic of the image, and for outputting data of the first characteristic extracted;
    a display part for designating a particular region within a visual field;
    a selector for selecting a position of the particular region designated by the display part within the visual field; and
    a memory for storing the data of the first characteristic, extracted by the detector, of the image which corresponds to the particular region selected by the selector, as characteristic reference data,
    wherein the particular region which is designated by the display part and which is selected by the selector, is moved to follow movement of the object based upon the characteristic reference data.

2. The camera as claimed in claim 1, wherein there are provided a plurality of regions within the visual field, and
    wherein the selector is operated manually so that the particular region is selected from the plurality of regions.

3. The camera as claimed in claim 1, wherein the selector and the memory are constituted by a controller which controls an operation of the camera.

4. The camera as claimed in claim 1, wherein the detector further senses the image of the object, extracts a second characteristic of the image, and outputs data of the second characteristic extracted, after the selector selects the particular region within the visual field, and
    wherein the selector compares the data of the second characteristic with the characteristic reference data which is stored in the memory, so that a region generally coincident between the data of the second characteristic and the characteristic reference data is selected as a renewed particular region within the visual field.

5. The camera as claimed in claim 4, wherein the renewed particular region is displayed within the visual field when the selector selects the renewed particular region.

6. The camera as claimed in claim 4, wherein a photographing condition is determined on a basis of the image of the object which corresponds to the particular region selected by the selector, and
    wherein the photographing condition is renewed in response to the renewed particular region selected by the selector.

7. The camera as claimed in claim 4, wherein the characteristic reference data is renewed in response to the renewed particular region selected by the selector.

8. The camera as claimed in claim 1, wherein the data is of information upon a contour of the object.

9. The camera as claimed in claim 1, wherein the data is of information upon movement of the object.

10. The camera as claimed in claim 1, wherein the data is of information upon an area which is surrounded by a contour of the object.

11. A camera comprising:
a detector for sensing an image of plural objects, for extracting a first characteristic of the image, and for outputting data of the first characteristic extracted;
a recognition means for recognizing plural candidate regions on which the image of a main object can be located, on a basis of the data of the first characteristic extracted by the detector;
a selector for selecting one of the plural candidate regions, wherein the image of the main object is located; and
a memory for storing the data of the first characteristic, extracted by the detector, of the image which corresponds to the selected one candidate region, selected by the selector, as characteristic reference data.

12. The camera as claimed in claim 11, wherein the selector is operated manually.

13. The camera as claimed in claim 11, wherein the recognition means and the selector are constituted by a controller which controls an operation of the camera.

14. The camera as claimed in claim 11, which further comprises:
an outputting means for sensing the image of the at least one object, for extracting a second characteristic of the image, and for outputting data of the second characteristic extracted, after the one of the at least one candidate region is selected by the selector; and
a renewing means for comparing the data of the second characteristic being extracted by the outputting means, with the characteristic reference data stored in the memory, and for selecting a region which is generally common to the data of the second characteristic and to the characteristic reference data, as a renewal region.

15. The camera as claimed in claim 14, wherein the display part displays the renewal region when the renewing means selects the renewal region.

16. The camera as claimed in claim 14, wherein a photographing condition is determined on a basis of the image of the main object which is in the one, selected by the selector, of the at least one candidate region, and
wherein the photographing condition is renewed when the renewing means selects the renewal region.

17. The camera as claimed in claim 14, wherein the characteristic reference data is renewed when the renewing means selects the renewal region.

18. The camera as claimed in claim 14, wherein the outputting means is composed of the detector.

19. The camera as claimed in claim 11, wherein the data is of information upon a contour of the at least one object.

20. The camera as claimed in claim 11, wherein the data is of information upon movement of the at least one object.

21. The camera as claimed in claim 11, wherein the data is of information upon an area which is surrounded by a contour of the at least one object.

22. A camera comprising:
a detector for sensing an image of at least one object, for extracting a first characteristic of the image, and for outputting data of the first characteristic extracted;
a recognition means for recognizing at least one candidate region on which the image of a main object of the at least one object can be located, on a basis of the data of the first characteristic extracted by the detector;
a display part for designating each candidate region which is recognized by the recognition means;
a selector for selecting one candidate region designated by the display part, wherein the image of the main object is in the selected region; and
a memory for storing the data of the first characteristic, extracted by the detector, of the image which corresponds to the selected candidate region, as characteristic reference data.

23. The camera as claimed in claim 22, wherein the selector is operated manually.

24. The camera as claimed in claim 22, wherein the recognition means and the selector are constituted by a controller which controls an operation of the camera.

25. The camera as claimed in claim 22, which further comprises:
an outputting means for sensing the image of the at least one object, for extracting a second characteristic of the image, and for outputting data of the second characteristic extracted, after the one of the at least one candidate region is selected by the selector; and
a renewing means for comparing the data of the second characteristic being extracted by the outputting means, with the characteristic reference data stored in the memory, and for selecting a region which is generally common to the data of the second characteristic and to the characteristic reference data, as a renewal region.

26. The camera as claimed in claim 25, wherein the display part displays the renewal region when the renewing means selects the renewal region.

27. The camera as claimed in claim 25, wherein a photographing condition is determined on a basis of the image of the main object which is in the one, selected by the selector, of the at least one candidate region, and
wherein the photographing condition is renewed when the renewing means selects the renewal region.

28. The camera as claimed in claim 25, wherein the characteristic reference data is renewed when the renewing means selects the renewal region.

29. The camera as claimed in claim 25, wherein the outputting means is composed of the detector.

30. The camera as claimed in claim 22, wherein the data is of information upon a contour of the at least one object.

31. The camera as claimed in claim 22, wherein the data is of information upon movement of the at least one object.

32. The camera as claimed in claim 22, wherein the data is of information upon an area which is surrounded by a contour of the at least one object.

33. The camera as claimed in claim 1, further comprising a finder window displaying the visual field, and the display part displayed on the finder window.

34. The camera as claimed in claim 33, wherein the display part is movable within the finder window.

* * * * *